(12) United States Patent
Kim et al.

(10) Patent No.: US 7,756,517 B2
(45) Date of Patent: Jul. 13, 2010

(54) APPARATUS AND METHOD FOR VERIFYING RECEPTION AND EXECUTION STATUS OF TELECOMMAND IN SATELLITE CONTROL SYSTEM

(75) Inventors: In-Jun Kim, Daejon (KR); Won-Chan Jung, Daejon (KR); Jae-Hoon Kim, Daejon (KR)

(73) Assignee: Electronics and Telecommunications Research Institute, Daejon (KR)

( * ) Notice: Subject to any disclaimer, the term of this patent is extended or adjusted under 35 U.S.C. 154(b) by 827 days.

(21) Appl. No.: 11/543,177

(22) Filed: Oct. 4, 2006

(65) Prior Publication Data

US 2007/0111724 A1      May 17, 2007

(30) Foreign Application Priority Data

Nov. 17, 2005   (KR) ...................... 10-2005-0110283

(51) Int. Cl.
   *H04Q 7/20*   (2006.01)
(52) U.S. Cl. ...................................... 455/427; 455/12.1
(58) Field of Classification Search ................. 455/427
   See application file for complete search history.

(56) References Cited

U.S. PATENT DOCUMENTS

| | | | | |
|---|---|---|---|---|
| 4,688,250 A | * | 8/1987 | Corrington et al. .......... 713/170 |
| 5,721,810 A | * | 2/1998 | Hahn et al. .................... 706/47 |
| 5,951,609 A | | 9/1999 | Hanson et al. |
| 5,963,166 A | * | 10/1999 | Kamel ................... 342/357.01 |
| 5,966,640 A | * | 10/1999 | Leath et al. ................. 455/12.1 |
| 6,157,817 A | * | 12/2000 | Norin et al. .............. 455/67.11 |
| 6,343,205 B1 | * | 1/2002 | Threadgill et al. .......... 455/12.1 |
| 6,532,281 B1 | * | 3/2003 | Schoenborn ........... 379/114.01 |
| 6,597,892 B1 | * | 7/2003 | Caldwell et al. ........... 455/12.1 |
| 6,735,501 B1 | * | 5/2004 | Rulison et al. ................. 701/13 |
| 7,386,310 B2 | * | 6/2008 | Dai et al. ..................... 455/427 |
| 7,428,405 B2 | * | 9/2008 | Kim et al. .................. 455/12.1 |
| 2003/0017827 A1 | * | 1/2003 | Ciaburro et al. ............. 455/427 |

(Continued)

FOREIGN PATENT DOCUMENTS

JP         01-249595 A    10/1989

(Continued)

*Primary Examiner*—Duc Nguyen
*Assistant Examiner*—Hai V Nguyen
(74) *Attorney, Agent, or Firm*—Ladas & Parry LLP (57) ABSTRACT

Provided are an apparatus and a method for verifying a reception and execution status of telecommand in a satellite control system. The inventive apparatus for informing a satellite control system of a reception and execution status of telecommand in a satellite comprises a telecommand receiver for receiving a telecommand signal transmitted from a satellite control system, a link control unit for extracting a command transfer frame from the telecommand signal received in the telecommand receiver, judging whether or not the extracted command transfer frame is valid, and providing corresponding link verification telemetry information to a telemetry transmitter, a telemetry information database for storing a set of telecommand execution verification telemetry mnemonics or measured values, a telecommand/telemetry unit, when the telecommand is executed, for acquiring an execution verification telemetry mnemonic responding to the telecommand from the telemetry information database, and the telemetry transmitter for generating a telemetry transfer frame having the link verification telemetry information provided by the link control unit and the telecommand execution verification telemetry mnemonic acquired by the telecommand/telemetry unit as data field, and sending the generated telemetry transfer frame to the satellite control system.

11 Claims, 4 Drawing Sheets

U.S. PATENT DOCUMENTS

| | | | |
|---|---|---|---|
| 2003/0023175 A1* | 1/2003 | Arzbaecher et al. | 600/509 |
| 2003/0191402 A1* | 10/2003 | Arzbaecher et al. | 600/509 |
| 2004/0127158 A1* | 7/2004 | Dai et al. | 455/12.1 |
| 2005/0065445 A1* | 3/2005 | Arzbaecher et al. | 600/515 |
| 2006/0058023 A1* | 3/2006 | White et al. | 455/427 |
| 2006/0100752 A1* | 5/2006 | Kim et al. | 701/13 |
| 2006/0100846 A1* | 5/2006 | Lee et al. | 703/22 |
| 2006/0155840 A1* | 7/2006 | Giffin et al. | 709/224 |
| 2007/0129922 A1* | 6/2007 | Lee et al. | 703/13 |
| 2008/0249673 A1* | 10/2008 | Kim et al. | 701/13 |
| 2008/0313488 A1* | 12/2008 | Jeong et al. | 714/2 |

FOREIGN PATENT DOCUMENTS

| | | |
|---|---|---|
| KR | 1996-0027470 A | 7/1996 |
| KR | 1997-0012198 A | 3/1997 |
| KR | 1019960036378 A | 10/1998 |
| KR | 10 0204051 | 3/1999 |

* cited by examiner

APPARATUS AND METHOD FOR VERIFYING RECEPTION AND EXECUTION STATUS OF TELECOMMAND IN SATELLITE CONTROL SYSTEM

FIELD OF THE INVENTION

The present invention is related to a satellite communication system; and more particularly, to an apparatus and a method for verifying reception and execution status of telecommand in a satellite control system by employing an efficient telecommand reception and execution verification scheme.

DESCRIPTION OF RELATED ART

Generally, there is a need for a satellite control system that monitors and controls a status of a satellite on the ground in order to operate and manage the satellite, and specialized people is also necessary for its operation. The life time for operating the satellite starting from its launch usually ranges from 2-3 years to more than 15 years. During this term, numerous commands are sent to the satellite through the use of the satellite control system for operation thereof.

Therefore, transmission and verification of telecommands using such satellite control system are most frequently conducted in its operation and known as the most important work.

One of trends that recently appear in implementation of the satellite control system is an attempt to automate telecommand verification using a satellite operation knowledge base. Specifically, in such attempt, status information of telemetry data that reacts on telecommand is first used to make the knowledge base; and for cases that deviate from the rule, telecommand is automatically sent to resolve the problem.

In this system, however, some little time may be taken to process the telemetry data. This is because such telemetry data is generally carried in a fixed telemetry transfer frame and then got down wherein any telemetry information has a considerably long transfer period of dozens of seconds to several minutes.

Thus, verification on telecommand may be delayed until desired telemetry information is sent. This causes verification on command execution to be late and in turn transmission of next command to be retarded, which results in prolongation of the whole operation.

One of such prior arts is disclosed in U.S. Pat. No. 5,721,810 issued on Feb. 24, 1998, entitled "Method of Automatically Controlling and Verifying Telecommands in Satellite Control System."

This prior art totally depends on a knowledge base that is involved in a ground control system for confirming a normal or abnormal status of telecommand transmission. Therefore, such a prior art has a shortcoming in that it must await until all telemetry data are received by the ground control system and stored in the knowledge base to judge whether telecommand execution is normal or abnormal.

Another prior art is found in Korean Patent No. 10-0204051 issued on Mar. 25, 1999, entitled "Apparatus and Method for Reserving Telecommand for its Transfer to Satellite and Automatically Performing the Same".

This patent is to define a telecommand procedure that is given by a set of telecommands for their transmission automation, register it in a reservation table and then automate the telecommand transmission.

Therefore, if telecommands automatically sent by such prior art are verified in real-time through an apparatus and a method provided by the present invention, it would be the most ideal system. In other words, while the prior art has a structure for automatic execution of telecommands, the invention has an architecture for automatic verification of telecommands.

Still another prior art is proposed in U.S. Pat. No. 5,951,609 issued on Sep. 14, 1999, entitled "Method and System for Autonomous Spacecraft Control."

Since, however, such prior art wholly schedules, processes and verifies commands inside a satellite body for automatic operation of satellite, it has to incorporate therein all of such functions as work scheduling, error sensing, recovery and command execution.

SUMMARY OF THE INVENTION

It is, therefore, one of the objects of the present invention to provide an apparatus and a method for informing a ground station of a reception and execution status of telecommand in a satellite. In more detail, a command transfer frame is extracted from a telecommand signal transmitted from a satellite control system and it is judged whether or not the command transfer frame is valid or normal, and a telemetry transfer frame having as data field its corresponding link verification telemetry information and execution verification telemetry mnemonic responding to telecommand acquired when the telecommand is executed is generated and then transmitted to the satellite control system.

Another object of the present invention is to offer an apparatus and a method for verifying a reception and execution status of telecommand in a satellite control system. That is, after the telecommand is sent to a satellite, link verification telemetry information and telecommand execution verification telemetry mnemonic are extracted from a telemetry transfer frame transmitted from the satellite. And judgment is made as to whether or not the telecommand is correctly sent to the satellite based on the link verification telemetry information. And then, reference execution verification telemetry mnemonic or reference numerical value responding to the transmitted telecommand is searched by using information on the telecommand sent to the satellite, and the searched reference execution verification telemetry mnemonic is compared with the telecommand execution verification telemetry mnemonic to judge whether or not the telecommand is correctly executed in the satellite.

In accordance with one aspect of the present invention, there is provided an apparatus for informing a satellite control system of a reception and execution status of telecommand in a satellite, comprising: a telecommand receiving means for receiving a telecommand signal transmitted from the satellite control system; a link control unit for extracting a command transfer frame from the telecommand signal received in the telecommand receiving means, judging whether or not the extracted command transfer frame is valid, and providing corresponding link verification telemetry information to a telemetry transmission means; a telemetry information storing means for storing a set of telecommand execution verification telemetry mnemonics or measured values; a telecommand/telemetry unit, when the telecommand is executed, for acquiring an execution verification telemetry mnemonic responding to the telecommand from the telemetry information storing means; and the telemetry transmission means for generating a telemetry transfer frame having the link verification telemetry information provided by the link control unit and the telecommand execution verification telemetry mnemonic acquired by the telecommand/telemetry unit as data field, and sending the generated telemetry transfer frame to the satellite control system.

In accordance with another aspect of the present invention, there is provided a method for informing a satellite control system of a reception and execution status of telecommand in a satellite, comprising the steps of: receiving a telecommand signal from the satellite control system and extracting a command transfer frame from the received telecommand signal; judging whether or not the extracted command transfer frame is valid or normal; creating link verification telemetry information when it is judged that the extracted command transfer frame is in a valid state; acquiring an execution verification telemetry mnemonic responding to the telecommand when the telecommand is executed; and generating a telemetry transfer frame having the link verification telemetry information and the telecommand execution verification telemetry mnemonic as data field, and transmitting the telemetry transfer frame to the satellite control system.

In accordance with still another aspect of the present invention, there is provided an apparatus for verifying a reception and execution status of telecommand in a satellite control system, comprising: a telecommand transmitting means for transmitting a telecommand to a satellite and storing information such as execution time, mnemonic and argument on the transmitted telecommand in a transmission command storing means; the transmission command storing means for storing the execution time, mnemonic and argument for the telecommand sent from the telecommand transmitting means to the satellite; a telemetry reception means for receiving a telemetry transfer frame transmitted from the satellite and extracting link verification telemetry information and telecommand execution verification telemetry mnemonic from the received telemetry transfer frame; a command link verifying means for judging whether or not the telecommand is correctly transmitted to the satellite by using the extracted link verification telemetry information; a reference telemetry information storing means for storing a set of reference execution verification telemetry mnemonics or reference numerical values; and a command execution verifying means for searching a reference execution verification telemetry mnemonic responding to the telecommand from the reference telemetry information storing means based on information on the telecommand transmitted to the satellite, which is acquired by the transmission command storing means, and comparing the searched reference execution verification telemetry mnemonic with the telecommand execution verification telemetry mnemonic extracted from the telemetry transfer frame to judge whether or not the telecommand is correctly executed in the satellite.

In accordance with a further aspect of the present invention, there is provided a method for verifying a reception and execution status of telecommand in a satellite control system, comprising the steps of: when a telemetry transfer frame is received from a satellite, extracting link verification telemetry information and telecommand execution verification telemetry mnemonic from the received telemetry transfer frame; judging whether or not the telecommand is correctly transmitted to the satellite by using the extracted link verification telemetry information; searching a reference execution verification telemetry mnemonic or reference numerical value responding to the telecommand based on information on the telecommand transmitted to the satellite; and comparing the searched reference execution verification telemetry mnemonic with the extracted telecommand execution verification telemetry mnemonic or measured value to judge whether or not the telecommand is correctly executed in the satellite.

Further, the present invention supports a process that automates verification as to whether execution of telecommand is normal or abnormal, and reads telemetry information necessary for verifying telecommand executed in the satellite from the database and then carries it in telemetry transfer frame for transmission thereof to improve real-time performance in a control system of an earth geostationary orbit satellite. And also, the present invention supports a process that compares mnemonic information or measured value of telemetry data involved in the telemetry transfer frame with a reference value stored in the database that provides normal range information of telemetry value to verify rapidly as to whether the telecommand execution is successful or failed, and automate such operations in the satellite control system.

Furthermore, the present invention provides an infrastructure technology which is capable of efficiently processing a procedure of verifying success or failure of transmission and execution of telecommand that is positively necessary for automating the operation of the satellite control system and of sensing all errors that may take place in the telecommand transmission and execution through the step of verifying error of telecommand wireless link and result of telecommand execution. Further, the present invention offers an infrastructure technology capable of automating all procedures from telecommand transmission to its verification by improving real-time verification performance by way of decentralizing the function of verifying the telecommand execution result to the satellite and the satellite control system and also carrying information for verifying telecommand execution in the front of telemetry transfer frame for its transmission.

The other objectives and advantages of the invention will be understood by the following description and will also be appreciated by the embodiments of the invention more clearly. Further, the objectives and advantages of the invention will readily be seen that they can be realized by the means and its combination specified in the claims.

BRIEF DESCRIPTION OF THE DRAWINGS

The above and other objects and features of the instant invention will become apparent from the following description of preferred embodiments taken in conjunction with the accompanying drawings, in which.

DETAILED DESCRIPTION OF THE INVENTION

The above-mentioned objectives, features, and advantages will be more apparent by the following detailed description associated with the accompanying drawings; and thus, the invention will be readily conceived by those skilled in the art to which the invention pertains. Further, in the following description, well-known arts will not be described in detail if it seems that they could obscure the invention in unnecessary detail. Hereinafter, a preferred embodiment of the present invention will be set forth in detail with reference to the accompanying drawings.

Figure 1:
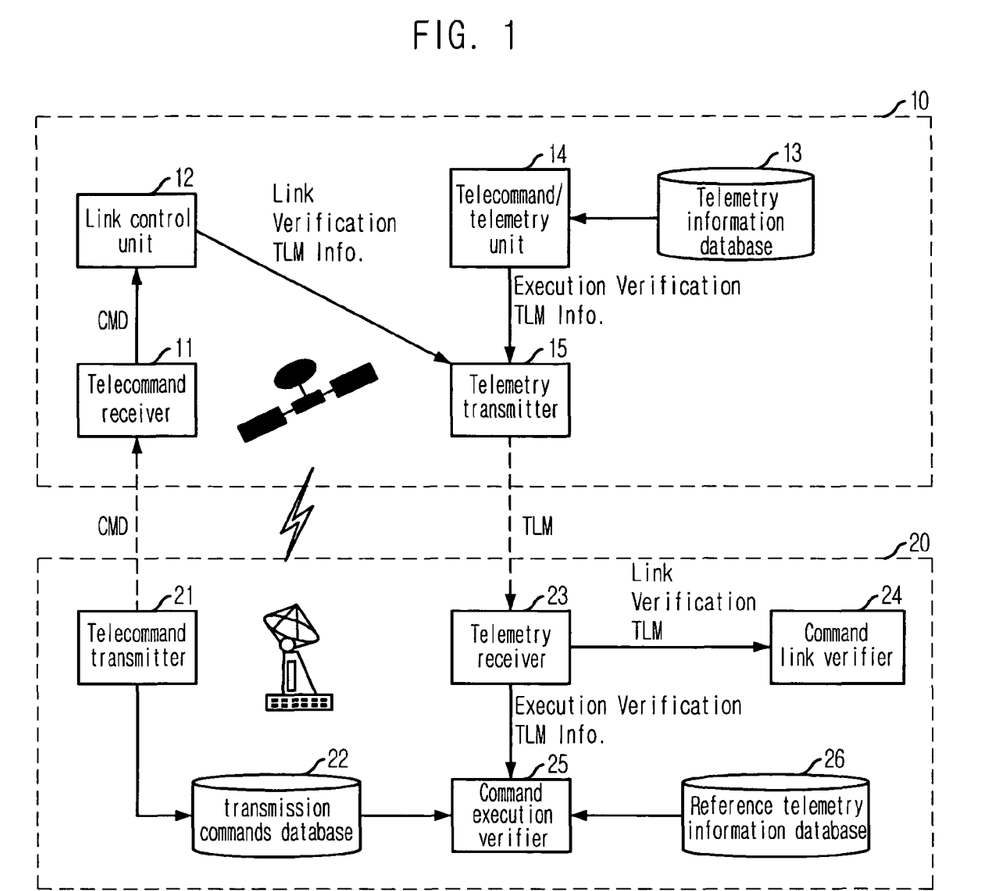
FIG. 1 is a block diagram showing a configuration of an apparatus for verifying a reception and execution status of telecommand in a satellite control system in accordance with an embodiment of the present invention.

FIG. 1 is a block diagram showing a configuration of an apparatus for verifying a reception and execution status of telecommand in a satellite control system in accordance with a preferred embodiment of the present invention.

As illustrated therein, the apparatus of the present invention comprises a satellite 10 and a satellite control system 20. The satellite 10 extracts a command transfer frame from a telecommand signal transmitted from the satellite control system 20 and judges whether or not the extracted command transfer frame is valid or normal. Thereafter, the satellite 10 generates a telemetry transfer frame having, as data field, corresponding link verification telemetry information and a telecommand execution verification telemetry mnemonic or measured value, acquired when the telecommand is executed, and then transmits it to the satellite control system 20. The satellite control system 20 sends the telecommand to the satellite 10 and then extracts the link verification telemetry information and telecommand execution verification telemetry mnemonic from the telemetry transfer frame transmitted from the satellite 10. Next, it judges as to whether or not the telecommand is correctly sent to the satellite 10 based on the link verification telemetry information and searches a reference telecommand execution verification telemetry mnemonic or reference numerical value by using information on the telecommand sent to the satellite 10, and then compares the searched reference execution verification telemetry mnemonic with the telecommand execution verification telemetry mnemonic to judge whether or not the telecommand is correctly executed in the satellite 10.

More specifically, the satellite 10 for informing the satellite control system 20 of the reception and execution status of telecommand includes a telecommand receiver 11, a link control unit 12, a telemetry information database 13, a telecommand/telemetry unit 14, and a telemetry transmitter 15.

The telecommand receiver 11 receives a telecommand signal from the satellite control system 20. The link control unit 12 extracts a command transfer frame from the telecommand signal received through the telecommand receiver 11, judges whether or not the extracted command transfer frame is valid or normal, and transmits its corresponding link verification telemetry information to the telemetry transmitter 15.

The telemetry information database 13 stores a set of telecommand execution verification telemetry information or telemetry mnemonics. The telecommand/telemetry unit 14, when the telecommand sent in real-time or stored on an on-board is executed, reads and collects a corresponding telecommand execution verification telemetry mnemonic from the telemetry information database 13. The telemetry transmitter 15 generates a telemetry transfer frame having the link verification telemetry information provided from the link control unit 12 and the telecommand execution verification telemetry mnemonic acquired by the telecommand/telemetry unit 14 as data field, and then sends the same to the satellite control system 20.

In the arrangement, the telemetry information database 13 stores telemetry mnemonics and grid information to be used in verifying execution of the telecommand in real-time by a central processing unit in the satellite 10 when the telecommand is executed.

The link control unit 12 checks validity of the transmitted telecommand frame and then provides the validity check result as telemetry information. In general, the satellite decodes all telecommands included in the telecommand transfer frame, increases a command counter value when each telecommand is recognized by an on-board computer, and then provides this as telemetry information, instead of offering telemetry information on transfer link status of the telecommand transfer frame. Therefore, the present invention enables a faster confirmation on whether or not the reception of telecommand is normally made in the satellite, compared to the existing method.

The telemetry information database 13, when any telecommand is executed, offers information of telemetry data that needs to be confirmed in connection with it. The present invention provides such information in the satellite 10 while the existing method contains this database in the satellite control system. Thus, telemetry information necessary for confirming telecommand execution result can be sent to the satellite control system 20 more rapidly.

The telecommand/telemetry unit 14 promptly collects specific telemetry data information confirmed by the telecommand verification telemetry database 13 and then organizes telemetry information for telecommand execution verification for its transmission to the telemetry transmitter 15, thereby transmitting the same to the satellite control system 20 through the telemetry transmitter 15.

In the present invention, the link control unit 12 is characterized by checking the validity of the transmitted telecommand frame and then providing the validity check result as telemetry information. The conventional satellite decodes all telecommands contained in the telecommand transfer frame, increases a command counter value when each telecommand is recognized by an on-board computer, and then provides this as telemetry information, rather than offering telemetry information on transfer link status of the telecommand transfer frame. Thus, the present invention enables a faster confirmation on whether or not the reception of telecommand is normally made in the satellite, compared to the existing method.

The telemetry information database 13 of the present invention, when any telecommand is executed, offers information of telemetry data that needs to be confirmed in connection with it. While the existing method contains the telemetry information database 13 in the satellite control system, the present invention provides such information in the satellite 10, and thus, telemetry information necessary for confirming telecommand execution result can be sent to the satellite control system 20 more rapidly.

Further, the telecommand/telemetry unit 14 of the invention immediately collects specific telemetry data information confirmed by the telemetry information database 13 and then organizes telemetry information for telecommand execution verification for its transmission to the telemetry transmitter 15, thereby transmitting the same to the satellite control system 20 through the telemetry transmitter 15.

Figure 2A:
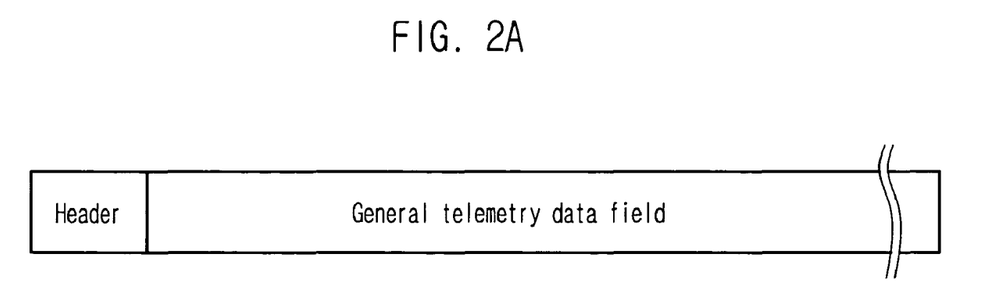
FIG. 2A is a view for describing a telemetry transfer frame for telecommand verification in accordance with a conventional invention.
Figure 2B:
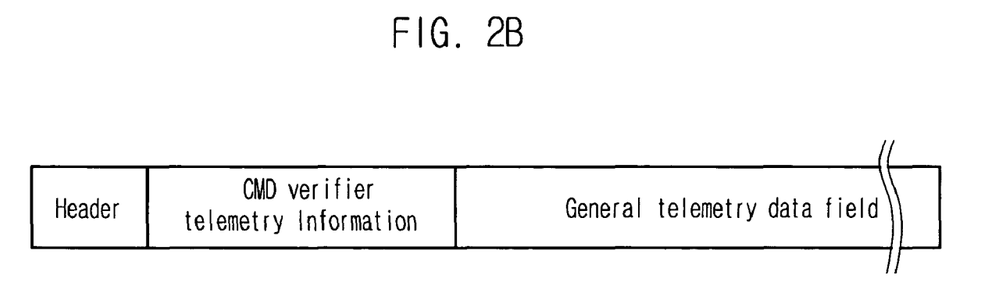
FIG. 2B is a view for describing a telemetry transfer frame for telecommand verification in accordance with an embodiment of the present invention.

For example, the telemetry transmitter 15 generates a telemetry transfer frame as shown in FIG. 2B.

On the other hand, the satellite control system 20 for verifying the reception and execution status of telecommand includes a telecommand transmitter 21, a transmission command database 22, a telemetry receiver 23, a command link verifier 24, a command execution verifier 25, and a reference telemetry information database or telecommand verification telemetry limit range database 26.

The telecommand transmitter 21 transmits a telecommand to the satellite and stores information such as execution time, mnemonic and argument on the transmitted telecommand in the transmission command database 22. The transmission command database 22 stores the execution time, mnemonic and argument information on the telecommand sent from the telecommand transmitter 21 to the satellite. The telemetry receiver 23 receives a telemetry transfer frame transmitted from the satellite and extracts link verification telemetry information and telecommand execution verification telemetry mnemonic or measure value therefrom. The command link verifier 24 judges whether or not the telecommand is correctly transmitted to the satellite by using the link verification telemetry information extracted from the telemetry transfer frame.

The command execution verifier 25 searches a reference telemetry mnemonic or reference numerical value for telecommand execution verification from the reference telemetry information database 26 based on information on the telecommand transmitted to the satellite, which is acquired by the transmission command database 22, and then compares the searched reference telecommand execution verification telemetry mnemonic with the telecommand execution verification telemetry mnemonic extracted from the telemetry transfer frame to judge whether or not the telecommand is correctly executed in the satellite. The reference telemetry information database 26 stores a set of reference telemetry mnemonics or reference numerical values for execution verification.

To be more specific, the command link verifier 24 analyzes the telemetry information for telecommand link verification carried in the telemetry transfer frame in order to judge whether or not the telecommand is correctly sent to the satellite. At this time, if the telecommand transmission failed, the telecommand may be resent automatically. Accordingly, the present invention can immediately cope with any error that may occur in the course of wireless link primarily.

Further, the command link verifier 24 provides the judgment result to the user.

The transmission command database 22 stores the execution time, mnemonic and argument information on telecommand to be sent from the telecommand transmitter 21 to the satellite, and helps the command execution verifier 25 inquire telecommand information that is expected to be executed in the satellite.

The command execution verifier 25 can recognize information of telecommand of which execution result needs to be verified in real-time or at a fixed specific time based on the transmitted telecommand information stored in the transmission command database 22. Therefore, although the telecommand is executed in the satellite, the satellite control system can expect the execution of the telecommand using the transmission command database 22 and also learn the execution purpose of the telecommand using the mnemonic and argument information of the telecommand to be executed.

Further, the command execution verifier 25 provides the judgment result to the user.

In telemetry to be confirmed for telecommand, the reference telemetry information database 26 provides a maximum value, a minimum value and a tolerable error range value for analog telemetry data, a status information value by argument setting of telecommand for digital telemetry data, and a reference value to judge whether or not telemetry information, received after providing a status information value for telemetry data of command with no argument, has a normal value.

The command execution verifier 25 judges whether or not the telecommand is correctly executed in the satellite based on telecommand execution verification telemetry information inserted into the telemetry data or telemetry transfer frame.

Namely, in the satellite, the telecommand may be executed immediately after its transfer or at a given specific time after being stored in an on-board memory. Thus, the command execution verifier 25 should learn when the telecommand will be executed. In the present invention, such time information can be found by the transmission command database 22.

In addition, a telemetry value to be confirmed should be known to judge whether or not telecommand expected to be executed is normally executed. In the present invention, such information can be found from the telemetry information for telecommand execution verification provided by the satellite.

Further, in addition to finding the telemetry value to be confirmed, it should be confirmed whether the telemetry value is in a normal state. In the present invention, this information can be learnt based on the reference telecommand verification telemetry database 26.

Meanwhile, in order to verify the telecommand execution by the existing method, a display page to see the telemetry data to be confirmed is first prepared. And then, an operator waits for a certain time period and then confirms a change of its value when the telecommand is executed, or confirms it depending on a knowledge-based system including telemetry information to be confirmed when the telecommand is executed.

In this case, however, the operator must wait for until the telemetry data to be confirmed is contained in the telemetry transfer frame and then sent. This is because all telemetry data are not sent in real-time but any of them may have a long period ranging from several seconds to several minutes.

Accordingly, the present invention allows the telemetry information for telecommand verification to be confirmed in the satellite and then to be inserted in the front of the telemetry transfer frame for its transmission, thereby enabling real-time verification.

FIG. 2A is a view for describing a telemetry transfer frame for telecommand verification in accordance with a conventional invention, and FIG. 2B is a view for describing a telemetry transfer frame for telecommand verification in accordance with an embodiment of the present invention.

As shown in FIG. 2A, the existing telemetry transfer frame in accordance with a conventional invention includes only a data field having a general telemetry data value.

However, as shown in FIG. 2B, the telemetry transfer frame in accordance with the present invention is configured to include a header followed by telecommand verification telemetry information having link verification telemetry information and telecommand execution verification telemetry mnemonic. Thus, more rapid confirmation of telecommand process status is possible in the satellite control system. Here, in case where the telecommand is not sent or not executed, it may be implemented in such a way that a flag bit is contained in the header to know such status and then sent together with the existing telemetry transfer frame of the conventional invention.

Figure 3:
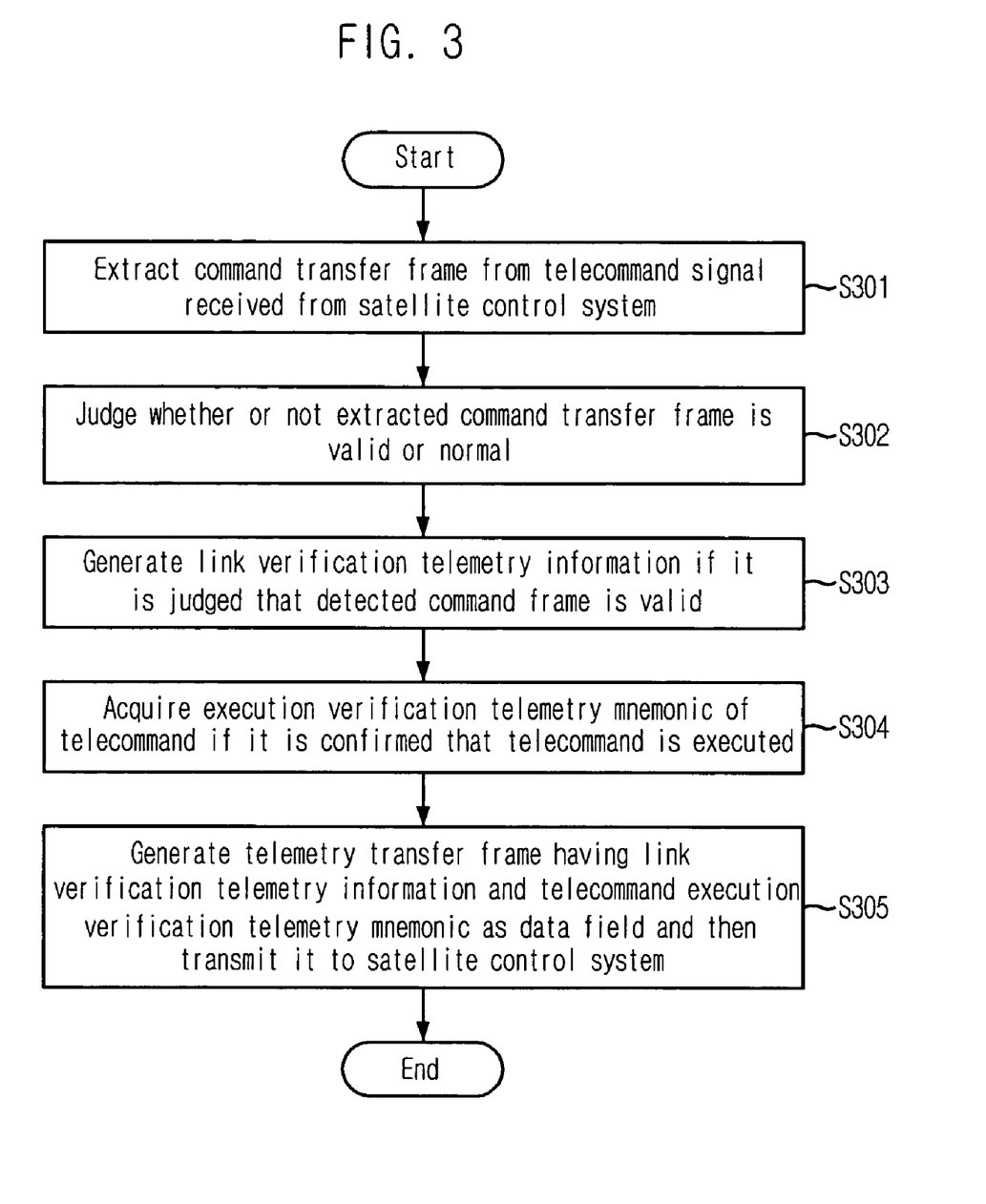
FIG. 3 shows a flowchart for describing a method for verifying a reception and execution status of telecommand in a satellite in accordance with an embodiment of the present invention.

FIG. 3 is a flowchart for describing a method for informing a satellite control system of a reception and execution status of telecommand in a satellite in accordance with an embodiment of the present invention.

First of all, the process of the present invention extracts a command transfer frame from a telecommand signal transmitted from a satellite control system at step S301.

Thereafter, the process judges at step S302 whether or not the extracted command transfer frame is valid or normal.

If it is judged that the extracted command transfer frame is valid, the process generates link verification telemetry information at step S303. But, if not, the process produces a telemetry transfer frame notifying failure of telecommand transmission and then sends the same to the satellite control system.

Next, if it is confirmed that the telecommand is executed, the process acquires and collects execution verification telemetry mnemonic or measured value responding to the telecommand at step S304.

At a last step S305, the process creates a telemetry transfer frame having the link verification telemetry information and telecommand execution verification telemetry mnemonic as data field and then transmits it to the satellite control system.

Figure 4:
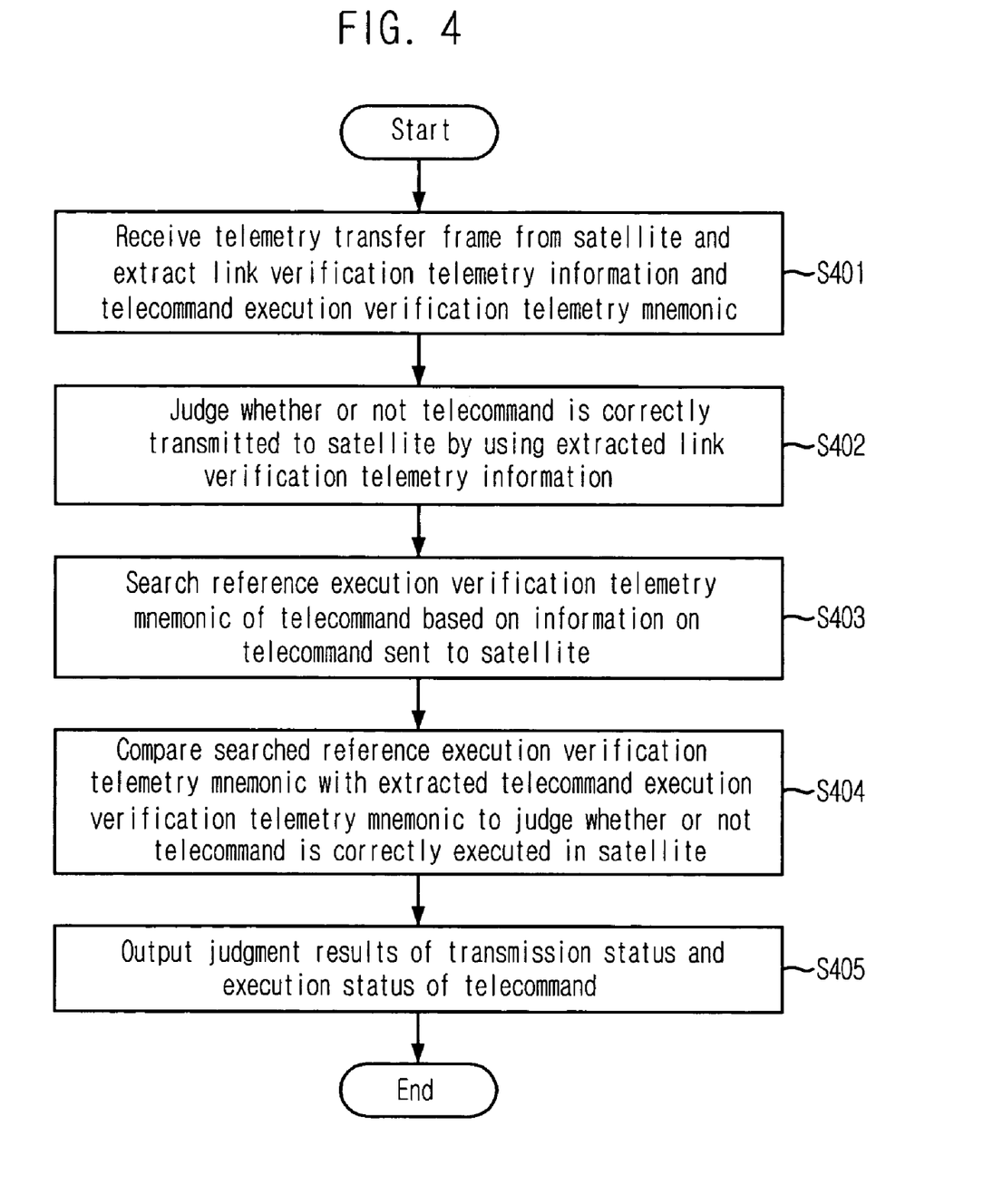
FIG. 4 is a flowchart for describing a method for verifying a reception and execution status of telecommand in a satellite control system in accordance with an embodiment of the present invention.

FIG. 4 is a flowchart for describing a method for verifying a reception and execution status of telecommand in a satellite control system in accordance with an embodiment of the present invention.

First, at step S401, when a telemetry transfer frame is received from the satellite, the process of the invention extracts link verification telemetry information and telecommand execution verification telemetry mnemonic therefrom.

And then, the process judges at step S402 as to whether or not the telecommand is correctly transmitted to the satellite by using the extracted link verification telemetry information.

Subsequently, the process, based on information on the telecommand transmitted to the satellite, searches a reference execution verification telemetry mnemonic or reference numerical value of the telecommand at step S403.

At a next step S404, the process compares the searched reference execution verification telemetry mnemonic with the extracted telecommand execution verification telemetry mnemonic to judge whether or not the telecommand is correctly executed in the satellite.

At a final step S405, the process outputs the judgment results of the transmission and execution status of the telecommand.

On the other hand, the present invention verifies the telecommand transfer link at a first stage and then the telecommand execution result at a second stage. Therefore, the invention allows the satellite control system to cope with the verification result at each stage appropriately and also to verify the telecommand process through the command link verifier 24 and the command execution verifier 25 at each stage, without any intervention of the operator.

Furthermore, the present invention is implemented in such a manner that the satellite transmits the telecommand verification telemetry information to the satellite control system for telecommand execution verification. By doing so, the present invention can verify the telecommand execution result without any delay and thus guarantee real-time characteristics.

Moreover, the present invention enables the satellite to provide the telemetry information to be confirmed after execution of the telecommand. Therefore, the satellite control system only needs to check the received execution verification telemetry data within a limited range, thereby rendering its database simplified.

And also, the present invention can confirm the telecommand execution result immediately although the telecommand is executed at anytime, by combining the information stored in the transmission command database 22 and the reference telemetry information database 26 and the telecommand execution verification telemetry information sent from the satellite. Thus, the operator doesn't need to know information associated with the telecommand execution in advance; and the present invention can perfectly verify the execution result although any command is executed.

As a result, the present invention has an advantage in that it enables a perfect verification on telecommand process by providing all verification functions related to the telecommand through the processes of verifying errors of telecommand wireless link and the result of telecommand execution, in the telecomamnd process of the satellite control system. Especially, the present invention can guarantee completeness and real-time characteristics with respect to a series of processes from transmission of telecommand to its verification by verifying telecommand execution result without any delay through the telecommand verification telemetry information provided by the satellite, telemetry protocol that transmits the information to the satellite control system, and the command execution verifier that confirms normal status value of the telecommand verification telemetry information transmitted through the protocol, in the telecommand execution verification.

Moreover, the present invention can achieve a perfect automation for telecommand process if it combines with a system that copes with and processes properly when any error is sensed in the course of verifying telecommand process.

The method of the present invention as mentioned above may be implemented by a software program and stored in a computer-readable storage medium such as CD-ROM, RAM, ROM, floppy disk, hard disk, optical magnetic disk, etc. This process may be readily carried out by those skilled in the art; and therefore, details of thereof are omitted here.

The present application contains subject matter related to Korean patent application No. 2005-110283, filed with the Korean Intellectual Property Office on Nov. 17, 2005, the entire contents of which are incorporated herein by reference.

While the present invention has been described with respect to the particular embodiments, it will be apparent to those skilled in the art that various changes and modifications may be made without departing from the spirit and scope of the invention as defined in the following claims.

What is claimed is:

1. An apparatus for informing a satellite control system of a reception and execution status of telecommand in a satellite, comprising:

a telecommand receiving unit for receiving a telecommand signal transmitted from the satellite control system;

a link control unit for extracting a command transfer frame from the telecommand signal received in the telecommand receiving unit, judging whether or not the extracted command transfer frame is valid, and providing corresponding link verification telemetry information to a telemetry transmission unit;

a telemetry information storing unit for storing a set of telecommand execution verification telemetry mnemonics or measured values;

a telecommand/telemetry unit, when the telecommand is executed, for acquiring an execution verification telemetry mnemonic responding to the telecommand from the telemetry information storing unit; and the telemetry transmission unit for generating a telemetry transfer frame having the link verification telemetry information provided by the link control unit and the telecommand execution verification telemetry mnemonic acquired by the telecommand/telemetry unit as data field, and sending the generated telemetry transfer frame to the satellite control system, wherein the extracted command transfer frame is configured to generate the telemetry transfer frame having the link verification telemetry information provided by the link control unit without being processed by an on-board computer, and wherein the telecommand execution verification telemetry mnemonic is configured to generate the execution verification telemetry mnemonic acquired by the telecommand/telemetry unit after being processed by the on-board computer.

2. The apparatus as recited in claim 1, wherein when the telecommand transmitted in real-time or stored on the on-board computer is executed, the telecommand/telemetry unit acquires a corresponding telecommand execution verification telemetry mnemonic from the telemetry information storing unit.

3. The apparatus as recited in claim 1, wherein the telemetry transmission unit generates the telemetry transfer frame having a header followed by telecommand verification telemetry information.

4. A method for informing a satellite control system of a reception and execution status of telecommand in a satellite, comprising:
  receiving a telecommand signal from the satellite control system and extracting a command transfer frame from the received telecommand signal;
  judging whether or not the extracted command transfer frame is valid or normal;
  creating link verification telemetry information when it is judged that the extracted command transfer frame is in a valid state;
  acquiring an execution verification telemetry mnemonic responding to the telecommand when the telecommand is executed; and
  generating a telemetry transfer frame having the link verification telemetry information and the telecommand execution verification telemetry mnemonic as data field, and transmitting the telemetry transfer frame to the satellite control system,
  wherein the telemetry transfer frame having the link verification telemetry information is generated without being processed by an on-board computer, and
  wherein the telecommand execution verification telemetry mnemonic is generated after being processed by the on-board computer.

5. The method as recited in claim 4, wherein the telemetry transfer frame comprises a header followed by telecommand verification telemetry information.

6. An apparatus for verifying a reception and execution status of telecommand in a satellite control system, comprising:
  a telecommand transmitting unit for transmitting a telecommand to a satellite and storing information such as execution time, mnemonic and argument on the transmitted telecommand in a transmission command storing unit;
  the transmission command storing unit for storing the execution time, mnemonic and argument for the telecommand sent from the telecommand transmitting unit to the satellite;
  a telemetry reception unit for receiving a telemetry transfer frame transmitted from the satellite and extracting link verification telemetry information and telecommand execution verification telemetry mnemonic from the received telemetry transfer frame;
  a command link verifying unit for judging whether or not the telecommand is correctly transmitted to the satellite by using the extracted link verification telemetry information;
  a reference telemetry information storing unit for storing a set of reference execution verification telemetry mnemonics or reference numerical values; and
  a command execution verifying unit for searching a reference execution verification telemetry mnemonic responding to the telecommand from the reference telemetry information storing unit based on information on the telecommand transmitted to the satellite, which is acquired by the transmission command storing unit, and comparing the searched reference execution verification telemetry mnemonic with the telecommand execution verification telemetry mnemonic extracted from the telemetry transfer frame to judge whether or not the telecommand is correctly executed in the satellite,
  wherein the telemetry transfer frame having the link verification telemetry Information is configured to be received without being processed by an on-board computer, and
  wherein the telemetry transfer frame having the executed verification telemetry mnemonic is configured to be received after having been processed by the on-board computer.

7. The apparatus as recited in claim 6, wherein in the telemetry to be confirmed for the telecommand, the reference telemetry information storing unit provides a maximum value, a minimum value and a tolerable error range value for analog telemetry data, a status information value by argument setting of telecommand for digital telemetry data, and a reference value to judge whether or not telemetry information, received after providing status information on telemetry data of command with no argument, has a normal value.

8. The apparatus as recited in claim 6, wherein the telemetry reception unit receives the telemetry transfer frame having a header followed by telecommand verification telemetry information.

9. A method for verifying a reception and execution status of telecommand in a satellite control system, comprising:
  when a telemetry transfer frame is received from a satellite, extracting link verification telemetry information and telecommand execution verification telemetry mnemonic from the received telemetry transfer frame;
  judging whether or not the telecommand is correctly transmitted to the satellite by using the extracted link verification telemetry information;
  searching a reference execution verification telemetry mnemonic or reference numerical value responding to the telecommand based on information on the telecommand transmitted to the satellite; and
  comparing the searched reference execution verification telemetry mnemonic with the extracted telecommand execution verification telemetry mnemonic or measured value to judge whether or not the telecommand is correctly executed in the satellite,
  receiving the telemetry transfer frame having the link verification telemetry information without being processed by an on-board computer, and
  receiving the telemetry transfer frame having the executed verification telemetry mnemonic after having been processed by the on-board computer.

10. The method as recited in claim 9, further comprising the step of outputting the judgment results of the transmission status and execution status of the telecommand.

11. The method as recited in claim 9, wherein the telemetry transfer frame includes a header followed by telecommand verification telemetry information.

* * * * *